Jan. 9, 1923.                                                                1,441,738.
G. C. MONTGOMERY.
TIRE TOOL.
FILED AUG. 31, 1921.                                                  2 SHEETS—SHEET 1.
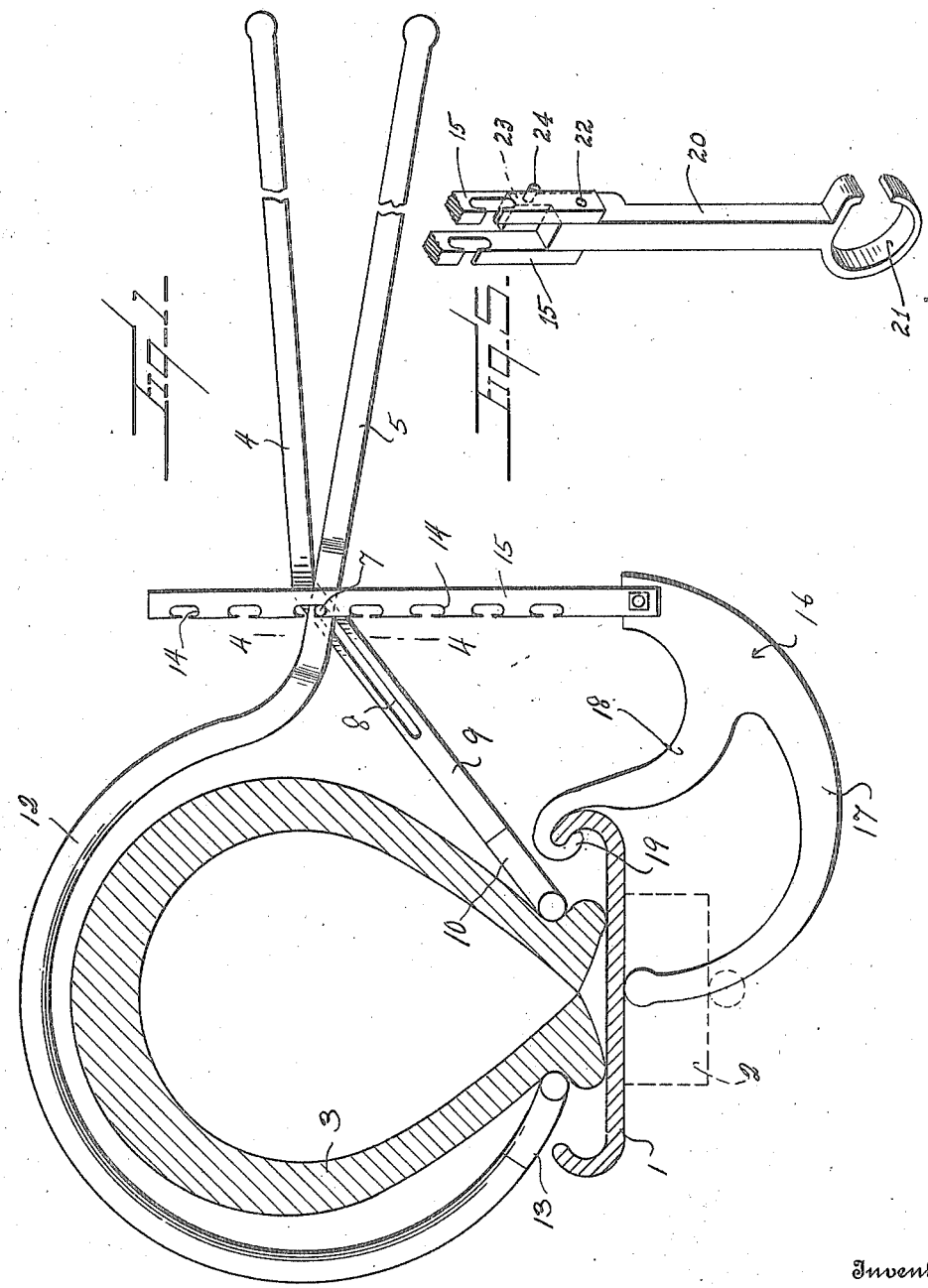
Inventor
G. C. Montgomery
By Watson E. Coleman
Attorney Jan. 9, 1923.   G. C. MONTGOMERY.   1,441,738.
TIRE TOOL.
FILED AUG. 31, 1921.   2 SHEETS—SHEET 2.
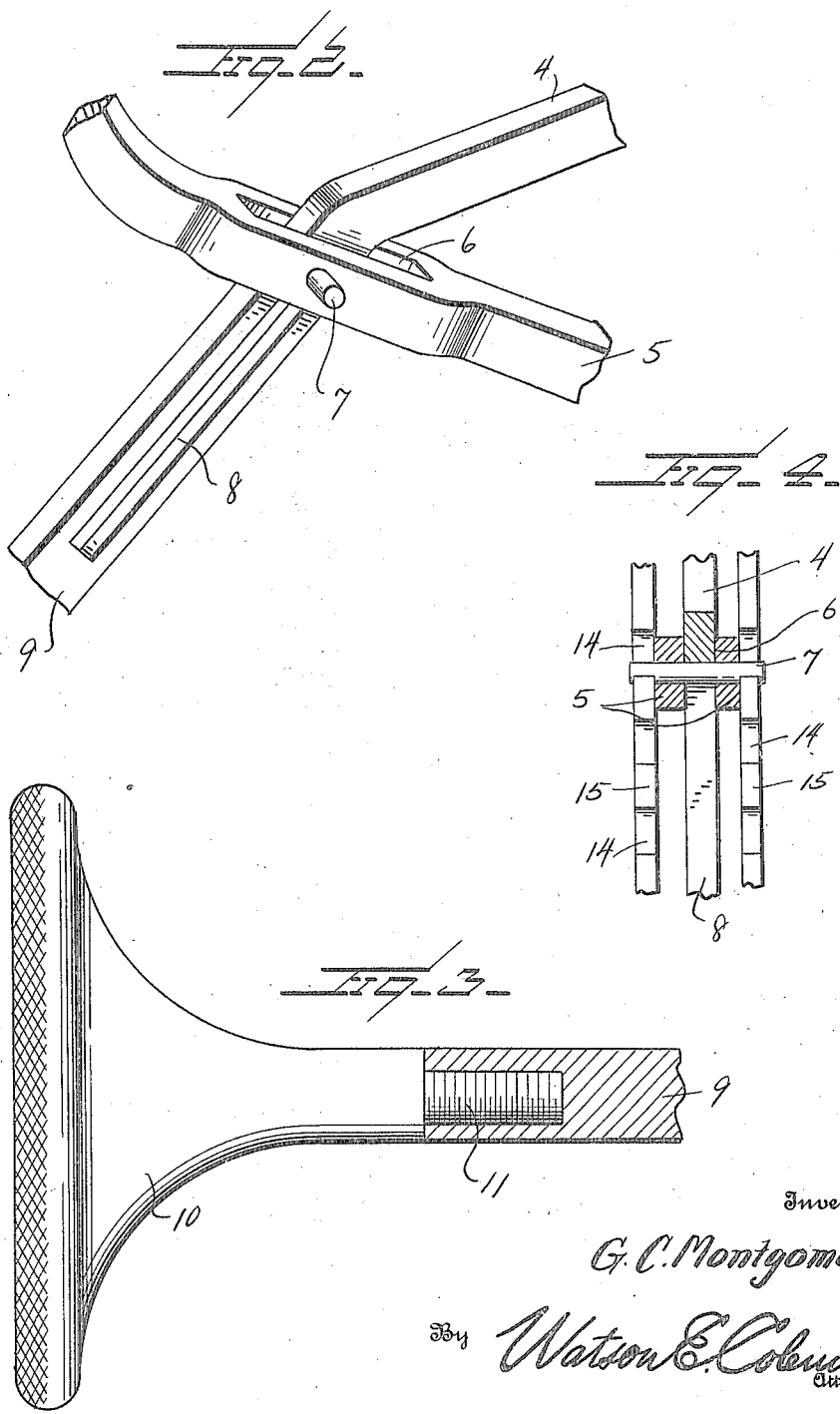

Patented Jan. 9, 1923.

1,441,738

UNITED STATES PATENT OFFICE.

GROVER C. MONTGOMERY, OF ELWOOD, INDIANA.

TIRE TOOL.

Application filed August 31, 1921. Serial No. 497,144.

*To all whom it may concern:*

Be it known that I, GROVER C. MONTGOMERY, a citizen of the United States, residing at Elwood, in the county of Madison and State of Indiana, have invented certain new and useful Improvements in Tire Tools, of which the following is a specification, reference being had to the accompanying drawings.

This invention relates to tire tools and more particularly to tools employed in the removal and replacement of pneumatic tires from permanent or demountable rims.

One of the principal objects of the invention is the provision of a simple, compact and inexpensive tool which may be cheaply constructed and which in operation will remove or replace a tire with a minimum of effort and in a minimum length of time.

Another object of the invention is the provision of a tool of this character having a novel type of fulcrum member which may be utilized with permanent or demountable rims.

A further object of the invention is the provision of a device of this character which may be operated either from a fulcrum member attached to the rim or to an extended fulcrum member attachable to the hub of the vehicle.

Further objects of the invention will appear as the following specific description is read in connection with the accompanying drawings which form a part of this application and in which:

Figure 1 is a side elevation of the tool shown applied for the removal of a tire from an ordinary clincher rim, the tire rim and felly being indicated in section;

Figure 2 is a detail perspective view showing the method of connecting the lever members together;

Figure 3 is a detail plan partly in section showing one of the flange engaging feet;

Figure 4 is a detail section taken approximately on the line 4—4 of Figure 1;

Figure 5 is a detail perspective view showing the connection of the fulcrum member with the extension hub mounting.

Referring to the drawing and more particularly to the structure shown in Figure 1 where the tool is applied to remove a tire from a permanent rim, 1 represents an ordinary clincher rim which is secured to the felly 2 and which has mounted thereon an ordinary clincher tire casing 3. The tool proper comprises crossed handle members 4 and 5, the latter of which is longitudinally slotted, as shown at 6, to receive the handle bar 4 which operates in the slot, as will be hereinafter described. The member 5 has secured thereto a pivot pin or axle 7 which passes across the slot 6 and through a slot 8 formed in the angularly bent inner end 9 of the handle member 4. This pin 7 being arranged in the slot 8 permits the handle member 4 to not only pivot upon the pin 7 but to reciprocate thereon, as will be more clearly understood. The handle member 4 has its angularly bent end 9 provided with a socket in its terminal to receive a tire engaging foot 10, which, as shown in Figure 3, is threaded into the socket, as indicated at 11, so as to be removable therefrom and also to turn upon the end 9 so that the foot may lie in a plane with the plane of the tool whereby it may be conveniently stored. The handle member 5, as indicated in Figure 1, is provided beyond the slot 6 with a curved tire encompassing portion 12, having secured to its terminal end a foot 13 similar to the foot 10 and connected in the same manner to the portion 12 as is the foot 10 to the angular end 9. In applying this tool, the handle member 4 is pulled outwardly so that the angular end 9 slides upon the pin 7 and is then tilted so as to be out of the path of the opening in the tire encompassing portion 12 where the foot 13 has been properly engaged with the casing 3 adjacent its marginal flange, the handle member 4 is pushed inwardly as far as possible and then clamping action is placed upon the handle members 4 and 5 which causes them to clamp the marginal flanges of the casing together, the handle member 4 further sliding upon the pin as the clamping action takes place so as to insure its proper engagement with the casing.

As shown in Figure 2, the pin or shaft 7 extends beyond the sides of the member 5 so as to form fulcrum extensions which are adapted to selectively engage the notches 14 formed in the spaced bars 15 which are pivoted to the outer end of the fulcrum member, generally indicated at 16. This fulcrum member comprises an arcuate arm 17 and a radial arm 18 having at its inner terminal end a hook 19 arranged to engage over and under the flange of the rim 1. In such position, the inner terminal end of the arcuate arm 17, opposite to the end to which the bars 15 are pivoted, engages beneath the felly 2, or as will be readily understood, beneath the rim in case the device is used for removing or replacing tires upon a demountable rim.

After the tool proper has been engaged, as above described, with the casing and the fulcrum member 16 mounted upon the rim, pressure is applied to both handle members 4 and 5 which causes the casing to be lifted at the point where engaged by the tool and pulled laterally off of the rim. In replacing a tire, the position of the tool shown in Figure 1 is simply reversed and the tire pulled upwardly and laterally on to the rim, it being understood that the major portion of the the tire is first placed upon the rim by hand.

In some instances it may be found inconvenient to utilize the fulcrum member 16, and in such cases I attach to the lower ends of the bars 15 an extension bar 20, having mounted thereon, as shown in Fig. 5, a hub engaging member 21. The member 20 has the opposite end from the hub engaging member 21 provided with a bolt receiving aperture 22 adapted to receive a bolt for connecting the member 20 to the bar 15. I also provide the member 20 with a longitudinal extension 23 having a pin 24 offset laterally from the aperture 22 so as to engage in front of the bars 15 so as to prevent breaking of the joint rearwardly or inwardly away from the wheel but to permit of a breaking of the joint forwardly or toward the wheel when desired. In the employment of this extension, the hub engaging portion 21 is engaged over the extended hub and the bars 15 attached to the upper end by a bolt passing through the bolt hole 22 and through the bolt holes in the lower ends of the bar 15. In this position, as shown, the pin 24 rests against the front of the bars 15 and prevents breaking of the joint as before described.

What I claim is:

In a tire tool, a pair of crossed handle members, one of which is slotted, a pivot pin extending across the slot, the other member passing through the slot of the first member and being slotted to receive the pin whereby the second member is slidably and pivotally connected to the first member, tire engaging jaws on said members, one of which is arranged to encompass the tire, a fulcrum member arranged to connect with the upper side of the rim and bear against the under side and an adjustable connection between the fulcrum member and the pivot pin of the handles.

In testimony whereof I hereunto affix my signature.

GROVER C. MONTGOMERY.